United States Patent Office.

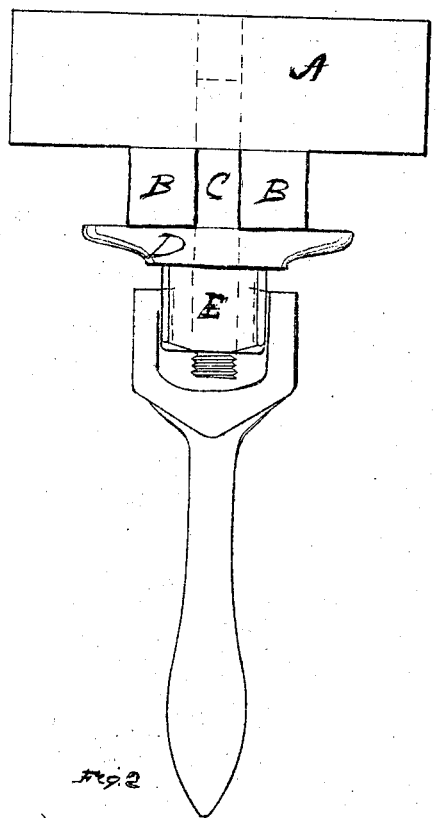
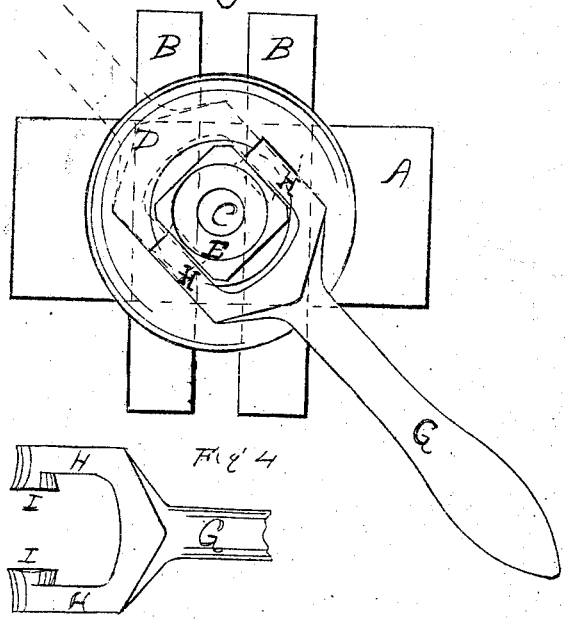
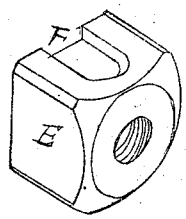
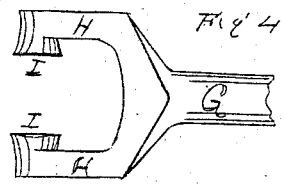

CHARLES L. KINGSLEY, OF MERIDEN, CONNECTICUT, ASSIGNOR TO CHARLES PARKER, OF SAME PLACE.

*Letters Patent No. 71,885, dated December 10, 1867.*

IMPROVEMENT IN CLAMP-SCREWS.

*The Schedule referred to in these Letters Patent and making part of the same.*

TO ALL WHOM IT MAY CONCERN:

Be it known that I, CHARLES L. KINGSLEY, of Meriden, in the county of New Haven, and State of Connecticut, have invented a new Improvement in Clamp-Screws; and I do hereby declare the following, when taken in connection with the accompanying drawings, and the letters of reference marked thereon, to be a full, clear, and exact description of the same, and which said drawings constitute part of this specification, and represent, in—

Figure 1, a front view.
Figure 2 an under side view looking up, the lever turned up.
Figure 3 a perspective view of the nut detached, and in
Figure 4 the handle detached.

This invention relates to an improvement in clamp-screws, or such as are used for securing vises to a bench, or the tail-stock and rest to lathes, and for other similar purposes. As heretofore constructed, the nut has been formed as itself a part of a handle, or so as to apply a detachable wrench thereto whenever it was necessary to adjust the part clamped by the nut. If the handle be fixed, it is often inconvenient to turn the handle, inasmuch as the handle must pass quite around in order to turn the nut around, or if a detachable wrench be used, its liability to be out of place, and not at hand when wanted, makes a very serious objection to the detachable wrench.

By my invention these difficulties are entirely overcome; and my invention consists in forming a seat in the two opposite sides of the nut, and constructing a lever, with its end as a yoke, to pass over the nut, and with trunnions upon the inside of the yoke, so as to set into the seats formed in the nut, and so that the lever will swing freely in its seat when the nut is placed upon the screw, so that the lever may be turned up and serve as a convenient arrangement for adjusting the nut.

To enable others to construct my improvement, I will proceed to describe the same, as illustrated in the accompanying drawings.

A represents the thing to be clamped, and B B the lathe shears or bench, or whatever it be that the thing A is to be clamped upon ; C, the bolt ; D, a washer between the nut E and the bench B. The nut is applied to the bolt, and secures the thing A in the usual manner. The nut E, I form with a recess, F, upon opposite sides, (see fig. 3,) the recess extending from the top of the nut down towards its lower end, and so that at the end of the recess F a seat is formed. The lever G is formed with a yoke, H H, so as to set over the nut, as seen in fig. 3, and upon the inside of the yoke are formed trunnions I I, so as to set into the recess F on the nut, and rest in the seat formed by the said recess. When the nut is placed upon the bolt, the lever is set into its position in the recesses of the nut, and hanging perfectly free in the seat, the lever drops, as seen in fig. 1, and when the nut is turned up to its place, or to a bearing to tighten the nut, turn up the lever, as seen in fig. 2; then the nut may be easily turned or re-turned to loosen and adjust the thing secured.

This improvement is cheap in its construction, in that both the nut and the wrench may be constructed from malleable iron, and completely formed in moulding.

Having thus fully described my invention, what I claim as new and useful, and desire to secure by Letters Patent, is—

The nut E, formed with the seats F, and the lever G, formed with the trunnions I, so as to be combined and operate in the manner and for the purpose described.

CHAS. L. KINGSLEY.

Witnesses:
   J. W. MILES,
   JOHN PARKER.